United States Patent [15] 3,700,724
Brady [45] Oct. 24, 1972

[54] PREPARATION OF ALLYLIC ESTERS WITH PALLADATE AND PLATINATE CATALYSTS

[72] Inventor: Donnie G. Brady, Bartlesville, Okla.

[73] Assignee: Phillips Petroleum Company

[22] Filed: Jan. 21, 1971

[21] Appl. No.: 108,617

[52] U.S. Cl.........260/491, 260/410.9 N, 260/468 R, 260/469, 260/475 N, 260/476 R, 260/485 N
[51] Int. Cl................................................C07c 67/00
[58] Field of Search......260/491, 468 R, 469, 475 N, 260/485 N, 410.9 N, 476 R

[56] References Cited

UNITED STATES PATENTS

| | | |
|---|---|---|
| 3,360,548 | 12/1967 | Clark et al..................260/491 |
| 3,358,016 | 12/1967 | Kohll et al..................260/491 |
| 3,534,087 | 10/1970 | Leften et al................260/491 |

*Primary Examiner*—Vivian Garner
*Attorney*—Young and Quigg

[57] ABSTRACT

Tetrahalopalladate and tetrahaloplatinate catalysts effectively catalyze the preparation of allyl esters of carboxylic acids in the reaction between allyl halides and salts of carboxylic acids.

9 Claims, No Drawings

PREPARATION OF ALLYLIC ESTERS WITH PALLADATE AND PLATINATE CATALYSTS

FIELD OF THE INVENTION

This invention relates to a method of preparation of esters of carboxylic acids. In another aspect, it relates to catalysts to improve the reaction of allyl halides with salts of carboxylic acids.

DESCRIPTION OF THE PRIOR ART

Heretofore, it has been recognized that allyl halides react with alkali metal salts of carboxylic acids, usually at elevated temperatures, to form the corresponding esters. However, yields generally have been low, with conversion rates for the esterification process slow, consequently requiring excessive residence times in the reactors.

While the reaction of allyl halides with the carboxylic acid salts has been a general method of esterification in the teachings of organic chemistry, commercial success has been wanting or limited, awaiting discovery of methods sufficient to increase yields and with swifter, surer reactions. Amines, quaternary ammonium halides, and the like, have been used as catalysts, though with limited effectiveness.

Other methods of esterification are available, usually involving multiple steps, or relatively expensive or difficult to handle reagents such as the acid halides. Such processes have shortcomings compared to the simplicity and ease of using a direct reaction of an allyl halide with a carboxylic acid salt.

SUMMARY OF THE INVENTION

I have discovered that the reaction of an alkali metal hydrocarbon carboxylate with an allyl monohalide can be effectively catalyzed by the use of certain catalysts, specifically tetrahalopalladate or tetrahaloplatinate catalysts.

It is an object of my process and catalyst to provide for improved preparation of esters of hydrocarbon carboxylic acids. A further object of my invention is to provide more efficient methods for increased yields of allyl esters of hydrocarbon carboxylic acids.

DETAILED DESCRIPTION OF THE INVENTION

The tetrahalopalladate and tetrahaloplatinate catalysts of my invention can be represented by $M_2TX_4$. M is ammonium, or is an alkali metal such as lithium, sodium, potassium, rubidium, or cesium. T is platinum or palladium. X is a halogen, and is fluorine, chlorine, bromine, or iodine. These tetrahalopalladate and tetrahaloplatinate catalysts are not simply double salts of an alkali metal halide with such as palladous halide. Instead, a $PdX_4^=$ and the equivalent tetrahaloplatinate radical actually are separate complex radicals.

Examples of my catalysts include lithium tetraiodopalladate, sodium tetrabromoplatinate, potassium tetrachloropalladate, rubidium tetrafluoroplatinate, cesium tetraiodopalladate, and ammonium tetrabromoplatinate. Preparation of suitable catalysts useful in my invention is disclosed in such references as Holtslaw, Jr., H. F., 8 Inorganic Syntheses 234, McGraw-Hill (New York 1966).

The esterification reaction to which I refer is a reaction between an alkali metal hydrocarbon carboxylate containing up to four carboxylate groups with an allyl monohalide:

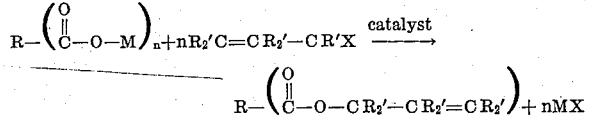

The number of carboxylate groups can range from 1 to 4, as represented by $n$ within the formulas above, and $n$ also is the valence of R. R is hydrogen or hydrocarbyl, and when hydrocarbyl, is saturated acyclic, saturated cyclic, aromatic, or alkyl-substituted aromatic in which there may be as many as three alkyl substitutions per aromatic group. The R can have up to 20 carbon atoms per R group, and, of course, will have a valence of $n$. R' is hydrogen or alkyl, and as many as three of the R' radicals can be alkyl, with up to as many as six carbon atoms in the total of all R' groups. M and X are as defined above relative to my catalysts.

The mole ratio of alkali metal carboxylate group to the allyl monohalide is in the range of 0.01:1 to 10:1, preferably 0.5:1 for most advantageous operation. From 0.1 to 100 moles of catalyst can be employed per 100 moles of carboxylate group, through preferably in the range of 0.5 to 10 moles per 100 moles of the carboxylate group are employed and result in suitable efficiency and conversion.

Temperatures in the range of 0° to 90° C. are employed in the esterification reaction with the catalysts of my invention. Temperatures within the range of 20° to 80° C. are found quite effective. Pressures should be sufficient to maintain the reactants and admixtures thereof substantially completely in the liquid phase, and usually will be in the range of 0.5 to 10 atmospheres. Atmospheric pressure often is a convenience and generally quite suitable. Reaction times sufficient to effect the degree of conversion should be employed. Normally, reaction times in the range of 1 minute to 24 hours are satisfactory. Preferably, the esterification should be effected substantially completely in the absence of water, i.e., under essentially anhydrous conditions so as to minimize undesirable side reactions. However, minor traces of water normally found associated with the reactants do not interfere unduly.

Upon completion of the desired degree of reaction, the ester produced can be recovered in any conventional manner. Any of the ordinary techniques known to the art for separation, such as filtration, stripping, solvent extraction, selective precipitation, and the like, can be employed as may be necessary or convenient.

The allylic esters produced in the processes of my invention are valuable products for wide commercial use as solvents, in lubricating oils, or for subsequent polymerization to valuable polyesters. The esters can be converted to epoxy compounds and employed with epoxy resin curing agents to form valuable adhesives, coatings, and the like. Such compositions also can be employed as plasticizers for synthetic resins and the like.

EXAMPLE

The following example should be considered as illustrative and not as limiting the scope of my invention.

To a stirred reactor were added 8.2 g (gram) (0.1 mole) of dry (anhydrous) powdered sodium acetate, 9.2 g (0.12 mole) allyl chloride, and 50 ml (milliliters) of dimethylformamide as diluent. No catalyst was used. The mixture was heated to a temperature of approximately 65° C., and maintained at such temperature for approximately 3 hours. The admixture subsequently was cooled to room temperature.

Analysis of a portion of the reaction products by gas liquid chromatography determined that only 20 mole per cent of the allyl chloride had been converted to allyl acetate.

A solution of freshly distilled allyl chloride (4.6 g, 0.06 mole) in N,N-dimethylformamide (25 ml) was added to 4.1 g (0.05 mole) sodium acetate. To this mixture was added 1.69 g (0.005 mole) of potassium tetrachloropalladate as catalyst. The resulting admixture was stirred at room temperature, and samples were removed each 30 minutes and analyzed by gas liquid chromatography. The analyses indicated complete conversion of the stoichiometric amount of allyl chloride (0.05 mole) to allyl acetate within 2 hours reaction time.

Thus, comparison of the run using one of my catalysts, versus the run without a catalyst, shows the high conversion obtained by the use of catalysts according to the process of my invention.

Certainly, the example given above illustrating some of the reactants possible within the scope of my invention and according to the process of my invention should not be considered as limiting in any way, but only illustrative of the compound types effective and useful.

Alkali metal hydrocarbon carboxylates including both monocarboxylates as well as polycarboxylates useful according to the process of my invention include:
 sodium benzoate,
 disodium isophthalate,
 potassium formate,
 lithium acetate,
 rubidium decanoate,
 cesium 3-methyloctanoate
 potassium cyclopentanecarboxylate,
 sodium 4-toluenecarboxylate,
 lithium 3,5-xylenecarboxylate,
 tripotassium 1,2,3-benzenetricarboxylate
 tetrasodium 1,2,4,5-benzenetetracarboxylate
 disodium 1,8-octanedicarboxylate,
 trisodium 1,3,6-hexanetricarboxylate,
 tetrasodium 1,2,7,8-octanetetracarboxylate,
 tetrasodium 1,2,4,5-cyclooctanetetracarboxylate,
 sodium cycloeicosanecarboxylate,
 sodium eicosanecarboxylate,
 sodium 2-naphthalenecarboxylate,
 potassium 2,4,6-tributylbenzenecarboxylate,
 tetrapotassium 1,10,11,20-eicosanetetracarboxylate,
 tetralithium 1,4,8,12-cycloeicosanetetracarboxylate,
 tetrapotassium 2,3,6,7-anthracenetetracarboxylate,
 tetrasodium 2,3,6,7-anthracenetetracarboxylate,
and the like.

Allyl monohalides which can be employed according to the process of my invention include:
 3-chloro-1Propene,
 3-chloro-1-butene,
 1-bromo-2-nonene,
 2-bromomethyl-1-octene,
 3-iodo-1-nonene,
 3-fluoro-2,3-diethyl-1-pentene,
 5-chloro-4-ethyl-3-heptene,
 3-chloromethyl-4-ethyl-3-hexene,
 3-bromo-3-propyl-1-hexene,
 2-(1-chloropropyl)-1-hexene,
 4-iodo-2-methyl-2-octene,
 4-iodo-2-methyl-2-octene,
 1-fluoro-2-pentene,
 2-chloromethyl-1-butene,
and the like.

It is frequently desirable for the reactions I have described to be effected in the presence of a gas which is substantially completely nonreactive in the reaction environment. Such gases as nitrogen, or a rare gas such as helium, neon, argon, or krypton, or a lower paraffin hydrocarbon such as ethane, and the like, can be employed.

The esterification reaction usually are effected in the absence of added diluents, though where desired for various purposes reaction diluents can be employed in amounts which can comprise as much as 95 percent by weight of the reaction medium. Examples of materials which can be suitably employed as diluents include acetone, methyl ethyl ketone, methyl isobutyl ketone, tetrahydropyran, cyclohexanone, tetrahydrofuran, cyclododecanone, N-methylpyrrolidone, sulfolane, dioxane, dihydrocarbylamides such as N,N'-dimethylformamide and N-methyl-N-phenylformamide, acetonitrile, propionitrile, and the like, and even mixtures if desired.

Reasonable variations and modifications are possible within the scope of my disclosure without departing from the scope and spirit thereof.

I claim:

1. A process for preparing esters of hydrocarbon carboxylic acids which comprises reacting a hydrocarbon carboxylate with at least one allyl monohalide in the liquid phase at 0° to 90° C. in the presence of an effective amount of at least one catalyst selected from tetrahalopalladates and tetrahaloplatinates wherein said catalyst is $M_2TX_4$ wherein M is ammonium, lithium, sodium potassium, rubidium, or cesium; T is platinum or palladium; X is fluorine, chlorine, bromine, or iodine; said hydrocarbon carboxylate is

wherein R is hydrogen or hydrocarbyl containing up to 20 carbon atoms wherein said hydrocarbyl is alkyl, cycloalkyl, aryl or alkyl substituted aryl containing up to 3 alkyl substituents; $n$ is an integer of from 1 to 4 inclusive and is equal to the valence of R; and said allyl monohalide is $R_2'2C$ $CR'$—$CR_2'X$ wherein $R'$ is hydrogen or alkyl such that the carbon atoms in the total of all $R'$ groups is from 0 to 6.

2. The process according to claim 1 wherein said $M_2TX_4$ tetrahalopalladate or tetrahaloplatinate catalyst is employed in an amount of from 0.1 to 100 moles of said catalyst per 100 moles of carboxylate group in said hydrocarbon carboxylate.

3. The process according to claim 2 wherein the mole ratio of said hydrocarbon carboxylate to said allyl monohalide is in the range of from 0.0:1 to 10:1.

4. The process according to claim 1 wherein the reaction is carried out at a temperature of 20° to 80°C. and a reaction time of from 1 minute to 24 hours.

5. The process according to claim 1 wherein the reaction is carried out in the presence of a non-reactive gas in the reaction environment.

6. The process according to claim 5 wherein said non-reactive gas is nitrogen, a rare gas, or lower paraffin hydrocarbon.

7. The process according to claim 1 wherein the reaction is carried out in the presence of a diluent comprising up to 95 weight per cent of the total reaction medium wherein said diluent is selected from the group of: acetone, methyl ethyl ketone, methyl isobutyl ketone, tetrahydropyran, cyclohexanone, tetrahydrofuran, cyclododecanone, N-methylpyrro-lidone, sulfolane, dioxane, N,N-dimethylformamide, N-methyl-N-phenyl formamide, acetonitrile, propionitrile and mixtures thereof 8. The process according to claim 7 wherein said allyl monohalide is allyl chloride, said hydrocarbon carboxylate is sodium acetate, and said catalyst is potassium tetrachloropalladate.

9. The process according to claim 8 wherein said diluent is N,N'-dimethylformamide.

* * * * *

UNITED STATES PATENT OFFICE
CERTIFICATE OF CORRECTION

Patent No. 3,700,724     Dated October 24, 1972

Inventor(s) Donnie G. Brady

It is certified that error appears in the above-identified patent and that said Letters Patent are hereby corrected as shown below:

Column 4, line 57, the formula should appear as shown below:

$$R^1_2C=CR^1-CR^1_2X$$

Signed and sealed this 10th day of April 1973

(SEAL)
Attest:

EDWARD M. FLETCHER, JR.       ROBERT GOTTSCHALK
Attesting Officer               Commissioner of Patents